United States Patent [19]
Ferrar

[11] 3,892,486
[45] July 1, 1975

[54] SEQUENTIALLY SWITCHED LASER GYRO

[75] Inventor: Carl M. Ferrar, Rockville, Conn.

[73] Assignee: United Aircraft Corporation, East Hartford, Conn.

[22] Filed: Apr. 23, 1973

[21] Appl. No.: 355,348

[52] U.S. Cl. .......................... 356/106 LR; 332/7.51
[51] Int. Cl. ............................................... H01s 3/10
[58] Field of Search ............... 356/106 LR, 114, 28; 331/94.5 A; 332/7.51; 350/153

[56] References Cited
UNITED STATES PATENTS
3,537,027  10/1970  Smith .......................... 356/106 LR OTHER PUBLICATIONS
Vasiler et al., "Polarization Splitting of Opposing Waves in the Ring Laser," 6/69, pg. 619-621, Zhuwal Prihl. Sept., Vol. 10, No. 6.
Frodkin et al., "Competition of . . . Magnetic Field," pp. 45-47, Optics & Spectroscopy, Vol. 28, No. 1, 1/70.

Primary Examiner—Maynard R. Wilbur
Assistant Examiner—N. Moskowitz
Attorney, Agent, or Firm—M. P. Williams

[57] ABSTRACT

A laser gyro having a polarization anisotropy in the optical path includes means for adjusting the physical length of the closed loop laser cavity, for adjusting the isotropic resonant frequency of the cavity, cyclically, thereby to cyclically alternate the sustained laser oscillations between two essentially orthogonal polarization states at wavelengths which are adjusted upwardly or downwardly from the isotropic cavity resonant wavelength so that the wavelength of each sustained wave will be essentially at the maximum of the gain versus wavelength profile of the laser gain medium. Additionally, bias used to avoid frequency locking is sequentially reversed. Rate indications resulting from operation with one polarization are subtracted from indications resulting from operation at the other polarization, which yields double the sensitivity obtained with bias switching alone and provides cancellation of magnetic field effects and bias irregularities, as well as adverse effects, such as those due to backscattering. Opposite circular, elliptical, or linear polarizations may be used. The disclosure includes a variety of modes for sequential operation and for non-sequential differential operation.

12 Claims, 12 Drawing Figures

FIG. 2
(a) ISOTROPIC FREQUENCY
(b) WITH POLARIZATION ANISOTROPY
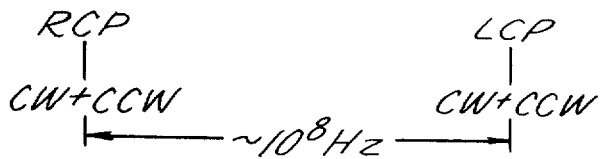
(c) WITH POS. DIRECTIONAL ANISOTROPY-(+BIAS)
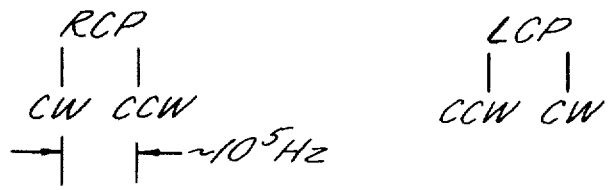
(d) WITH +BIAS AND +ROTATION
(e) WITH +BIAS AND −ROTATION
(f) WITH NEG. DIRECTIONAL ANISOTROPY (−BIAS)
(g) WITH −BIAS AND +ROTATION
FREQ.

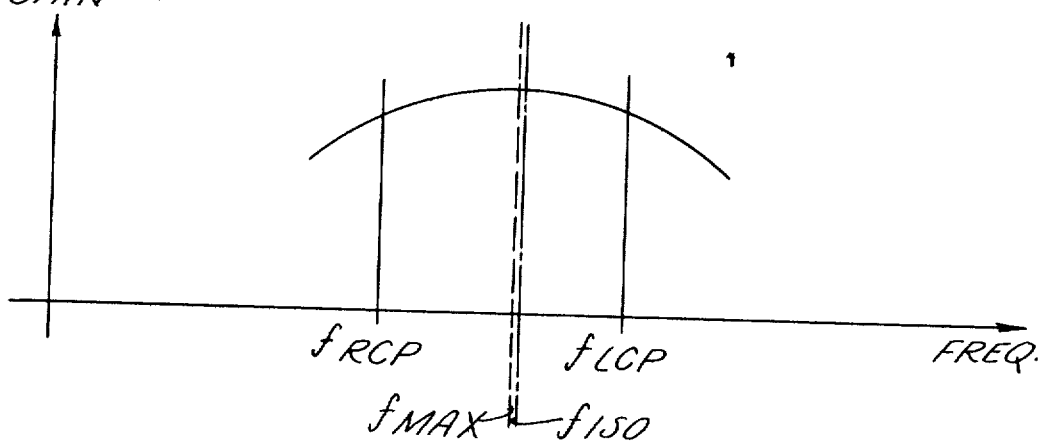
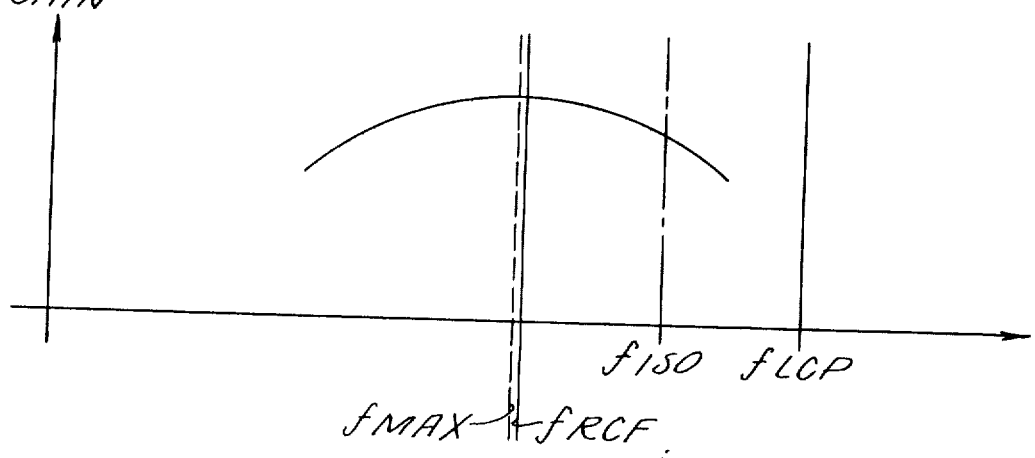
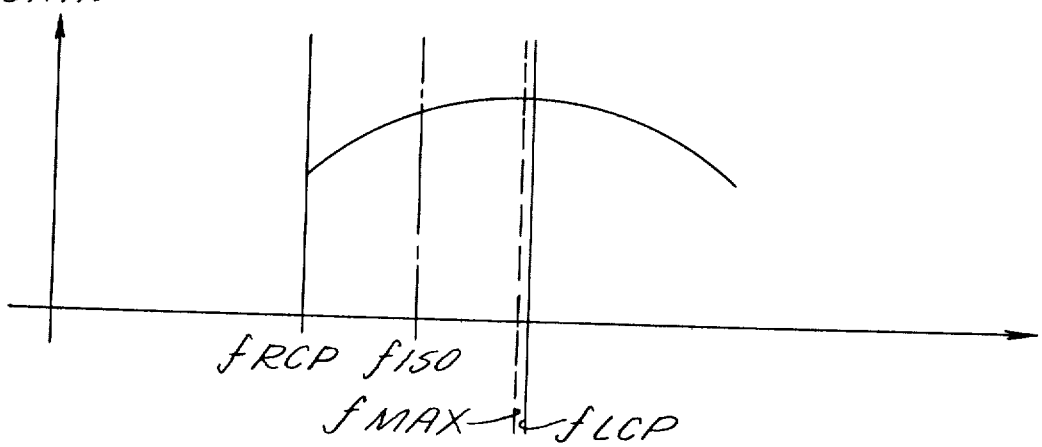

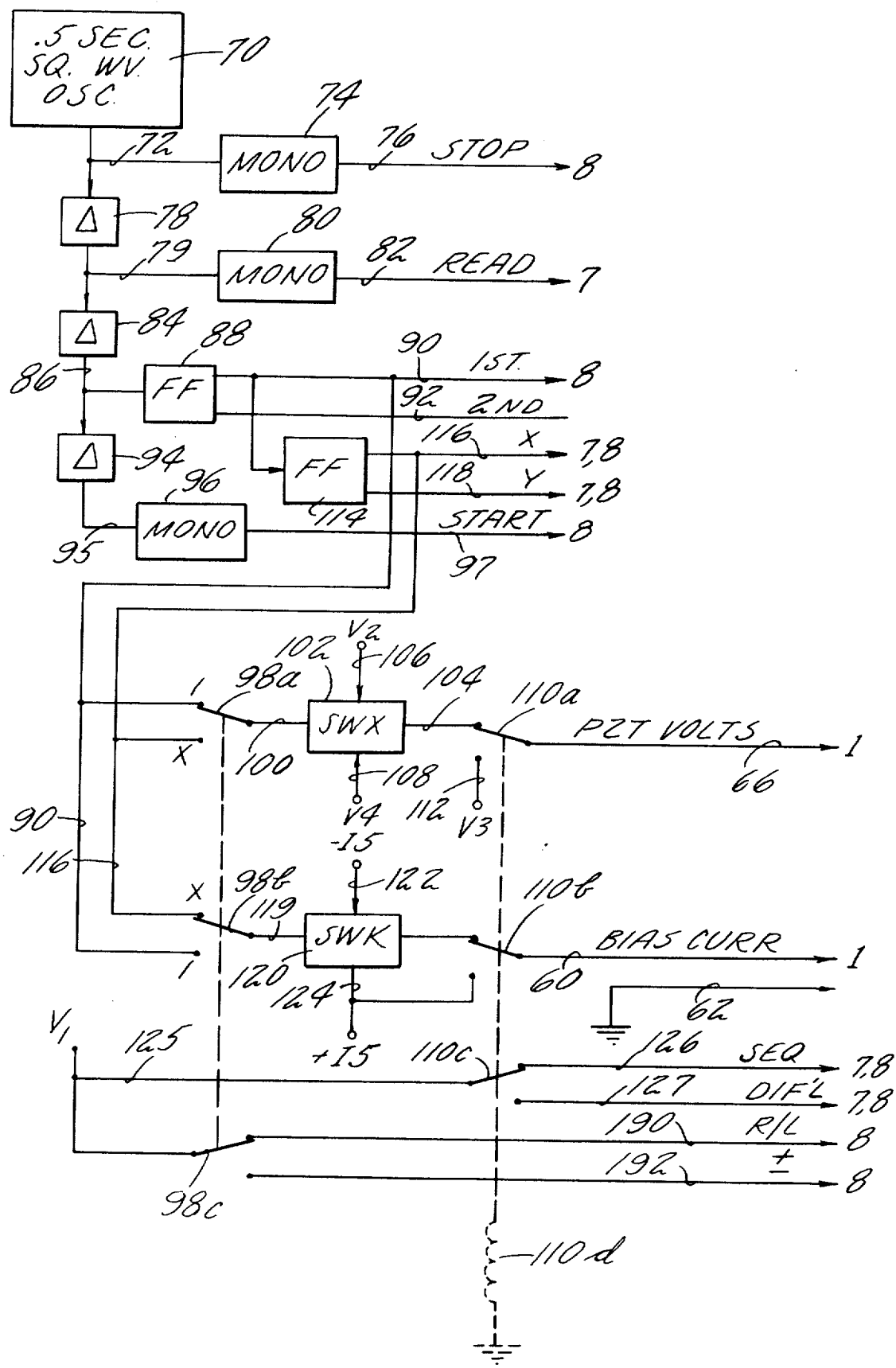

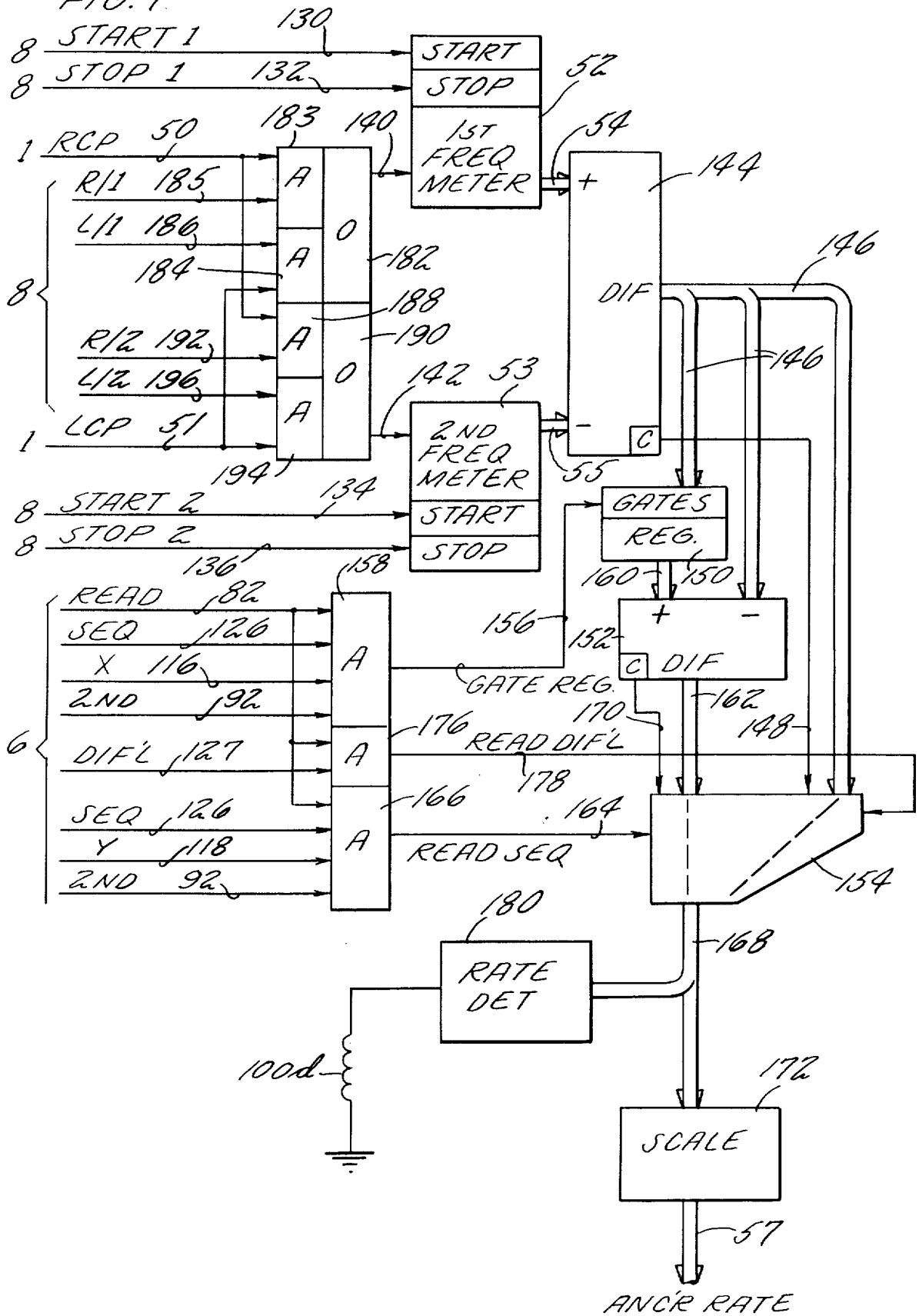

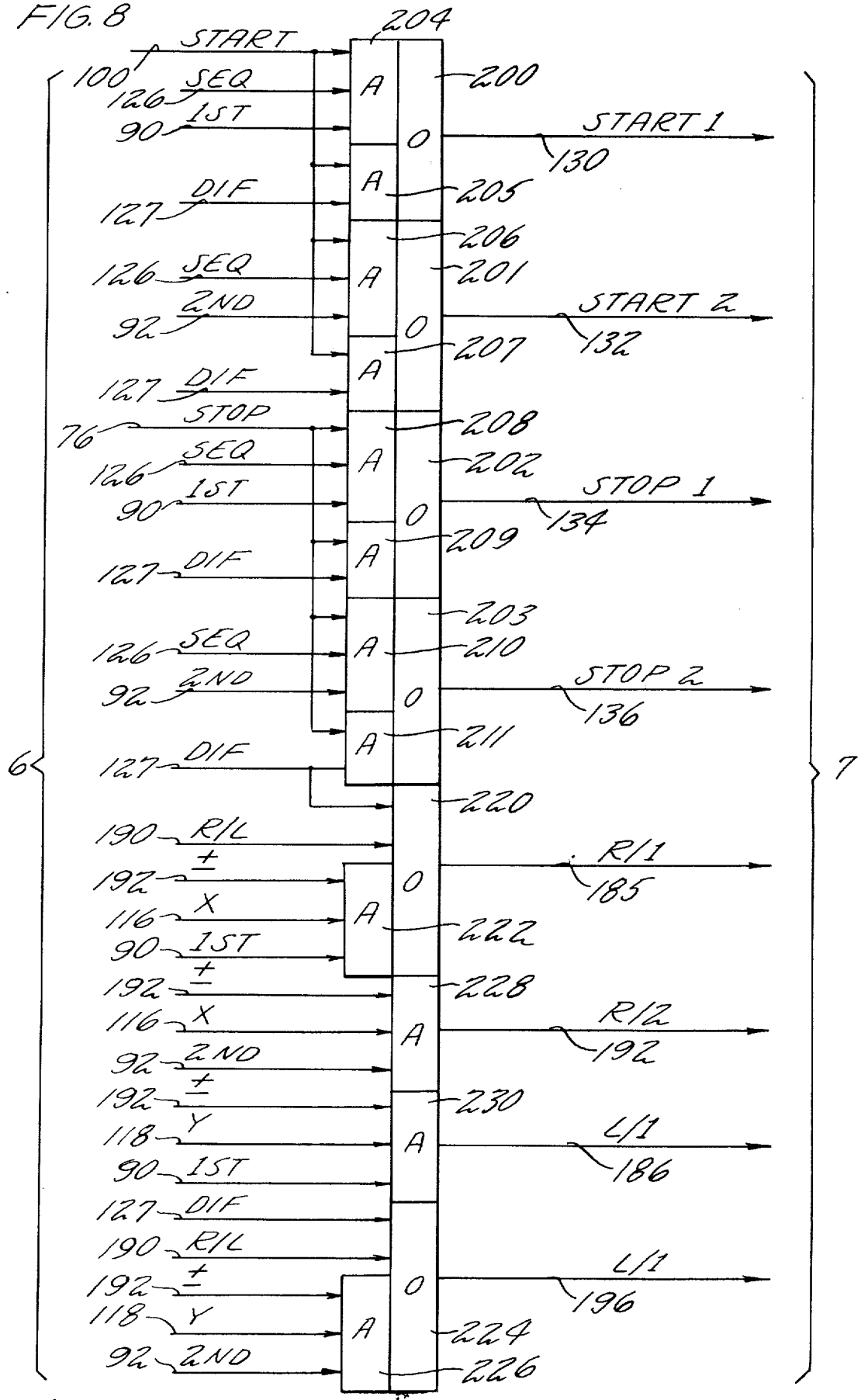

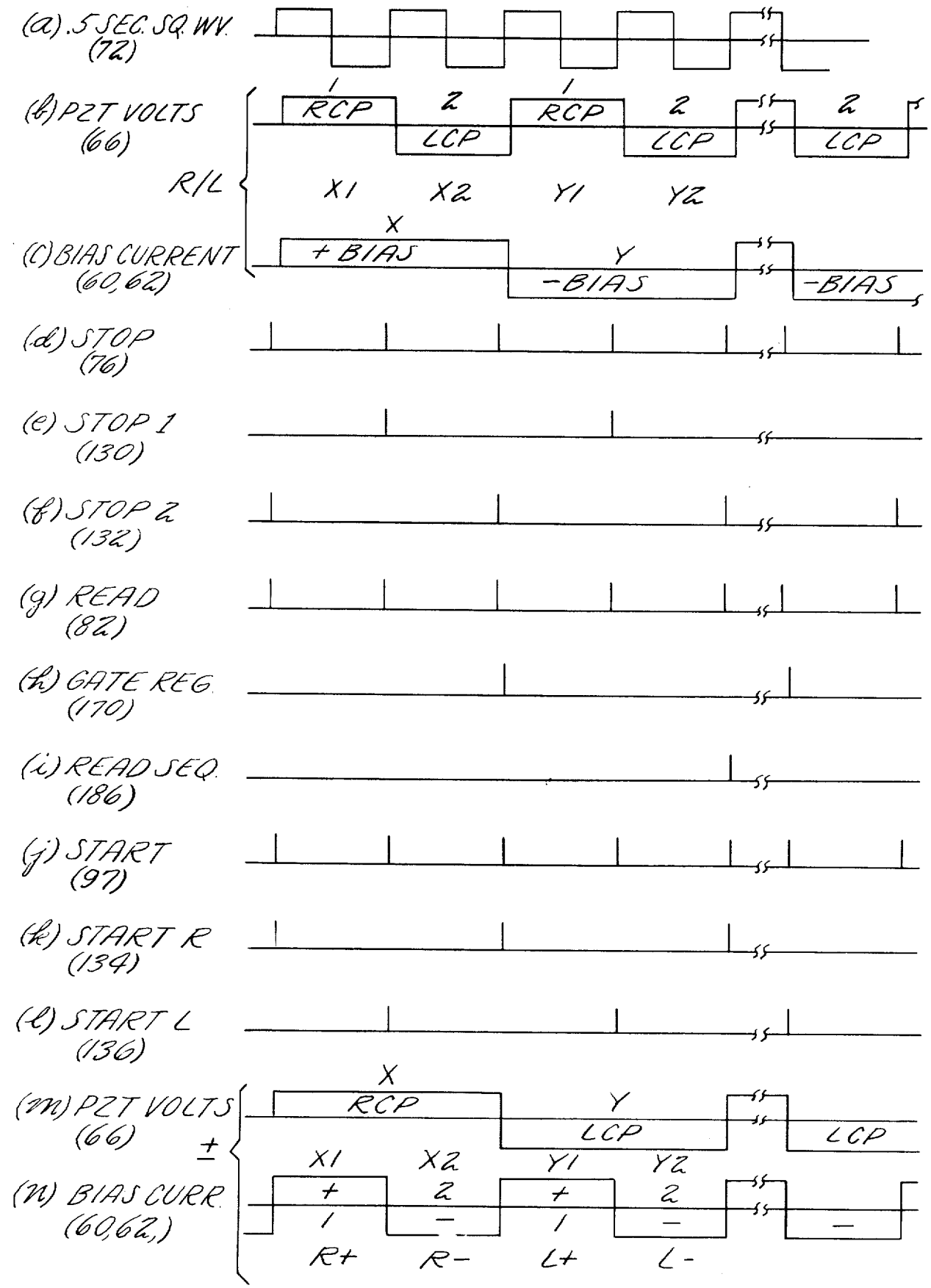

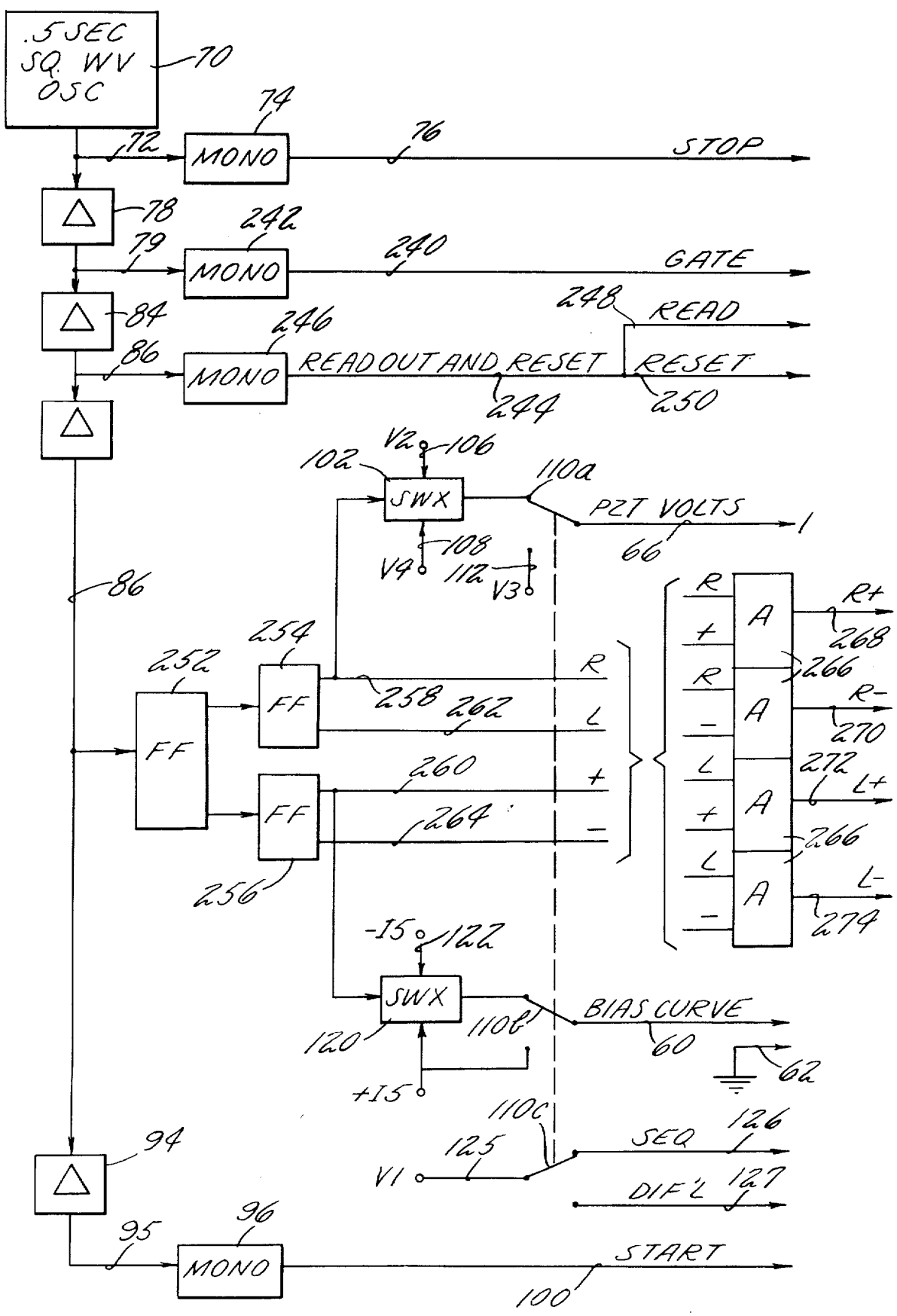

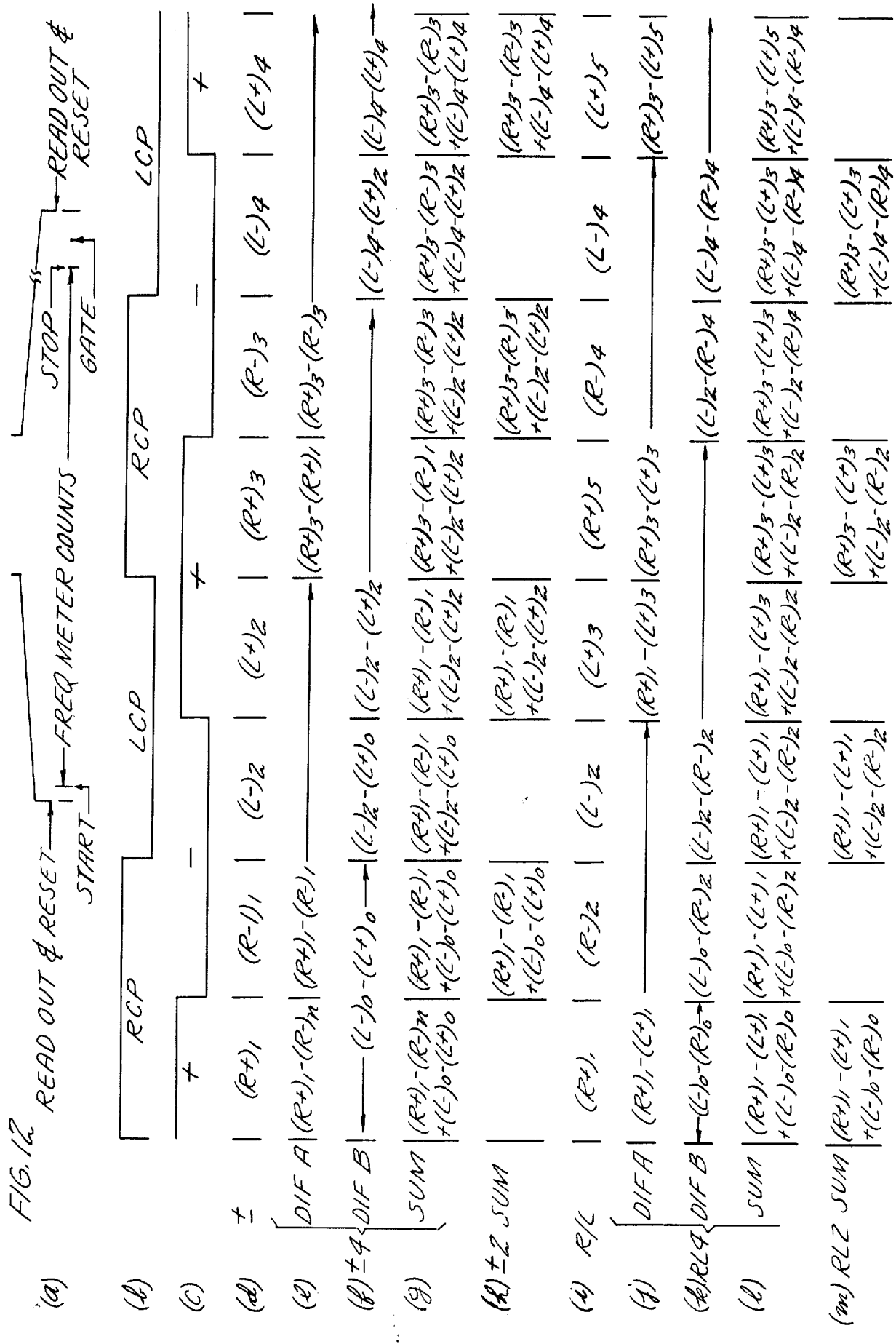

SEQUENTIALLY SWITCHED LASER GYRO

BACKGROUND OF THE INVENTION

1. Field of the Invention

This invention relates to laser gyros, and more particularly to a sequentially switched laser gyro.

2. Description of the Prior Art

Laser gyros known to the art commonly employ mechanical rotation or Faraday effect bias to separate the frequencies of counter rotating laser beams sufficiently to prevent frequency locking between the beams, particularly at low rotation rates. Periodic reversal of the bias is employed to minimize sensitivity to bias fluctuations and to provide partial cancellation of mode pulling and backscatter errors. The mechanical bias technique is undesirable from the standpoint of employing moving parts sensitive to the stresses of high acceleration. The Faraday bias method appears more desirable in this respect, but suffers from sensitivity to external magnetic fields and to possible bias reversal asymmetry.

A recent laser gyro improvement utilizes simultaneous, differential operation of two oppositely polarized Faraday biased gyros, operating on the same optical path, so arranged that the sum of their outputs provides twice the sensitivity to rotation of an individual laser gyro, but is substantially insensitive to external magnetic fields and bias fluctuations. A device of this type is disclosed in a commonly owned copending application of Yntema et al, Ser. No. 763,277, filed on Sept. 27, 1968, entitled DIFFERENTIAL LASER GYRO.

SUMMARY OF THE INVENTION

The principal object of the present invention is to provide an improved laser gyro.

This invention is predicated on the observation that many gyro errors, such as mode pushing, obtain in the differential laser gyro because the oppositely polarized gyros cannot simultaneously operate at the center of the laser gain-versus-frequency profile, and on the further observation that because of use of but a single bias polarity, although the bias is itself cancelled in the combined output, backscatter errors are not.

According to the present invention, a laser gyro having a closed loop laser cavity including polarization anisotropy comprises means for cyclically altering the length of the cavity so that, depending upon the polarization anisotropy, the waves of one polarization or the other are caused to be at a frequency very near the center of the gain-versus-frequency profile of the laser. In accordance further with the invention, the cavity includes a directional anisotropy (e.g. magnetic bias) which may be sequentially switched along with the cavity length so as to cancel out various bias errors and asymmetries, such as backscatter. In still further accord with the present invention, the laser may be operated in a differential laser gyro mode, as in the aforementioned copending application, which may be used as an adjunct in initializing sequentially switched operation, or as an alternative to certain sequential modes when desirable.

The present invention provides significant reduction in various errors which can result when the laser gyro is not operated at the center of the gain-versus-frequency profile, such as mode pushing, and significantly reduces backscatter error.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIGS. 2–5 are graphs illustrative of the basic principles of operation of the present invention;

FIG. 6 is a simplified schematic block diagram of timing and selection control circuitry for controlling the bias and the frequency of the gyro of FIG. 1;

FIG. 7 is a simplified schematic block diagram of elementary rate computer circuitry for use in the gyro of FIG. 1;

FIG. 8 is a simplified schematic block diagram of frequency meter controls for use in the embodiment of FIG. 1;

FIG. 9 is a diagram illustrative of the operation of the embodiment of the invention illustrated in FIGS. 1 and 6–9;

FIG. 10 is a simplified schematic block diagram of alternative timing and selection control circuitry for use in the embodiment of FIG. 1;

FIG. 12 is a diagram illustrative of operation of the embodiment of FIGS. 1 and 10–12.

DESCRIPTION OF THE PREFERRED EMBODIMENT

Figure 1:
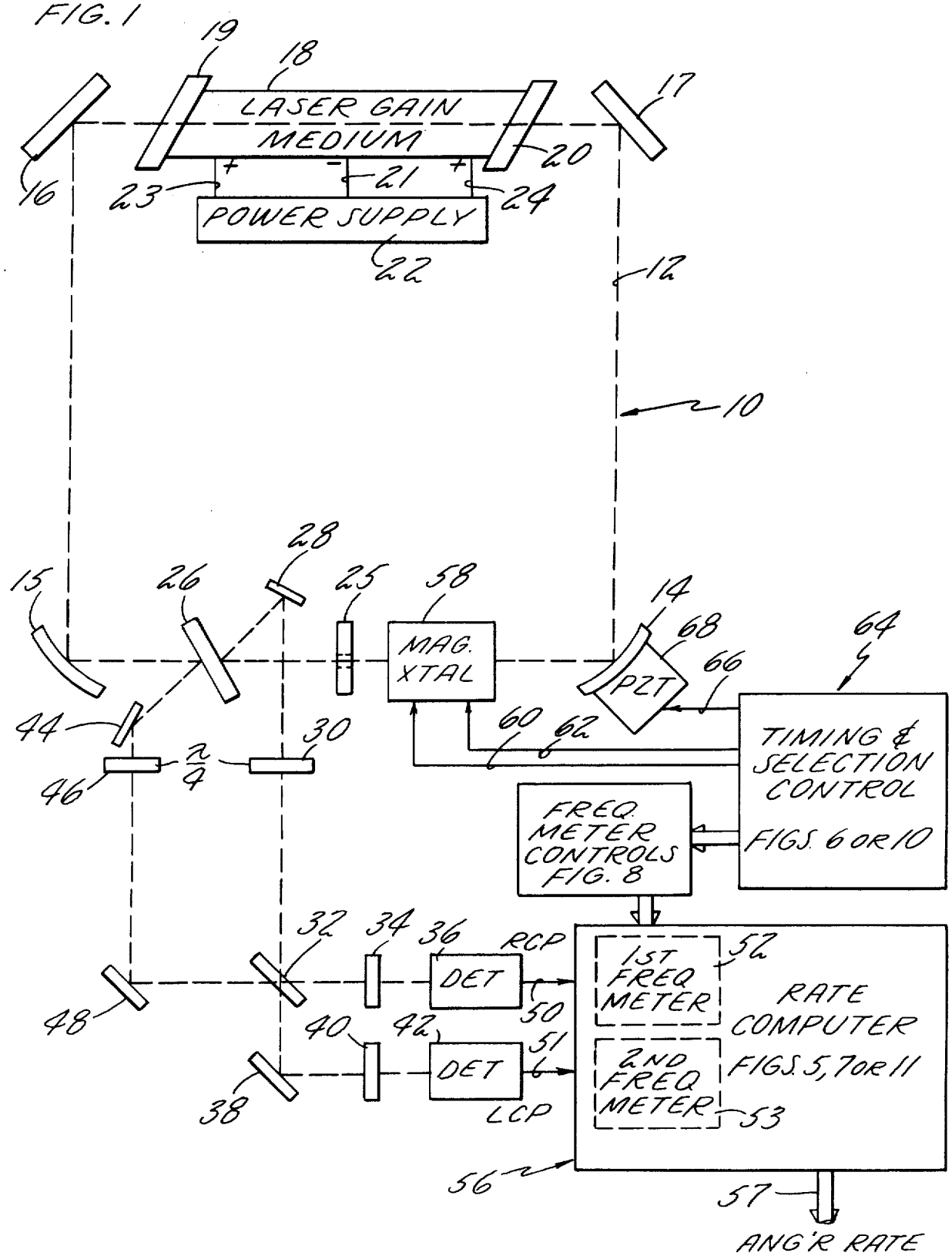
FIG. 1 is a simplified schematic block diagram of a sequentially switched laser gyro in accordance with the present invention.

Referring now to FIG. 1, a sequentially switched laser gyro in accordance with the present invention comprises a closed loop laser cavity 10 in which a laser beam or wave 12 is reflected by a plurality of mirrors 14–17. The mirrors 14, 15 may preferably be slightly concave so as to minimize diffraction losses about the cavity 10. In a four mirror cavity, two mirrors, rather than one, are preferably curved for symmetry in order to offset minor differences in effect which an odd number of curved mirrors could have on oppositely traveling electromagnetic waves. The two other mirrors 16, 17 may preferably be flat, although they also could be slightly curved. A laser gain medium may be provided in a suitable closed chamber 18 which may preferably be closed off by anti-reflection coated windows 19, 20 at near normal incidence (to minimize extraneous polarization anisotropy). Alternatively, the entire laser cavity may comprise a closed chamber, eliminating the need for windows.

The laser gain medium may preferably comprise helium and neon, the neon may preferably be an equal mixture of neon-20 and neon-22. A mixture of 18 parts of helium to 1 part each of the 2 isotopes of neon is found to be satisfactory, as are other mixtures in accordance with the individual desired characteristics of any given implementation of the present invention. Alternatively, other known laser gain media may be employed.

The laser gain medium may be excited by DC fields created between a cathode (not shown) which is supplied negative voltage over a line 21 from a DC power supply 22, and a pair of anodes (not shown) which are supplied a positive voltage over respective lines 23, 24 from the power supply 22. The opposite orientation of the anodes is utilized to minimize the effects of Langmuir flow, as is well known in the art; alternatively, RF excitation may be utilized, as is known, if desired.

One or more apertures 25 may be used in the laser cavity to ensure oscillation in a single transverse mode of the cavity. Size and placement of such apertures may be determined empirically so as to optimize oscillation strength and minimize non-reciprocal effects on the oppositely travelling waves.

As is known, the laser cavity 10 will support electromagnetic waves propagating in both the clockwise and counterclockwise directions, and rotation of the cavity 10 (together with the remainder of the hardware 14–20, and additional hardware physically related to the cavity 10) causes an increase in frequency of the wave travelling oppositely to the rotation and a decrease in frequency of the wave travelling in the same direction as the rotation. It is this difference of frequency which allows measurement of angular rates with lasers. Laser energy is extracted from the cavity 10 by a pickoff window 26 which may simply comprise an optically transmitting element with at least one surface coated for slight reflection at the laser wavelength, and slightly tilted to deflect the desired output energy. Slight lensing of window 26 may be employed as an alternative, or in addition, to the previously noted mirror curvature, for reduction of diffraction losses. The function of the window may be served by any transmission element in the optical path; e.g. by a quartz crystal described hereinafter.

The clockwise wave is reflected by a mirror 28 through a quarterwave plate 30 to a beam splitter 32 which causes a portion of the clockwise wave to pass through a polarizer 34 into an optical detector 36, and causes another portion of the clockwise wave to be reflected from a mirror 38 and pass through a polarizer 40, which is oriented with the opposite polarity of the polarizer 34, and to a detector 42. Similarly, the counterclockwise wave is reflected by a mirror 44 through a quarterwave plate 46 to a mirror 48 and thence to the beam splitter 32 so that a portion of the counterclockwise wave passes through each of the polarizers 34, 40 to the detectors 36, 42. The quarterwave plates 30, 46 are properly oriented to convert right circularly polarized and left circularly polarized waves into respective orthogonal linearly polarized waves so as to permit selection of the orthogonally polarized waves by the polarizers 34, 40 so that each detector 36, 42 will be responsive only to vertical or horizontal waves, respectively. Assume for purposes of illustration that the quarterwave plates convert right and left circular laser polarizations into horizontal and vertical polarizations, respectively, and that the polarizer 34 passes only horizontally polarized waves and the polarizer 40 passes only vertically polarized waves. The detector 36 will then respond to right circularly polarized waves of both the clockwise and counterclockwise directions in the cavity 10 and the detector 42 will respond only to the left circularly polarized waves of both the clockwise and counterclockwise directions in the cavity 10. In the detector 36, which is a nonlinear detector, the clockwise and counterclockwise horizontal components are mixed so as to provide an output frequency equal to the difference of the two input frequencies; similarly the detector 42 provides an output frequency equal to the difference of the frequency inputs thereto. The detectors 36, 42 are electrically incapable of responding to the very high optical sum frequencies also arising in the mixing process, and thus provide electric signals on related lines 50, 51 to respective frequency meters 52, 53 which represent only the difference frequency from the respective detectors. The frequency meters 52, 53 are well known in the art, and typically provide digital outputs, which are a measure of the frequency difference between the clockwise and counterclockwise waves of the respective polarization in the cavity 10, to an angular rate computing means 56 to provide angular rate signals at its output 57. The output of the frequency meters 52, 53 is a measure of angular rotation plus any bias which may be introduced into the system (usually provided by a suitable form of birefringence, such as the magnetic bias of a Faraday cell). In the present embodiment, birefringence (for directionally anisotropic bias) is provided by a crystal 58, such as quartz, which must be optically transparent and exhibit the Faraday effect, with a magnetic field impressed thereon (such as by a solenoidwound electrical coil, not shown). The coil of the magnetic crystal 58 is energized by a current applied by a pair of respective lines 60, 62 from a suitable source, which is included herein in a timing and selection control circuit 64. The control circuit 64 also provides a voltage on a line 66 to control a piezoelectric transducer (PZT) 68 which is used to adjust the position of the mirror 14. However, if symmetry is important, all of the mirrors may be controlled so as to vary the length of the cavity. Similarly, other means of controlling the optical path length may be used, as desired.

All of the apparatus described with respect to FIG. 1 thus far is identical or similar to counterpart apparatus found in the differential laser gyro of the aforementioned copending application, except that such apparatus need not employ the piezoelectric transducer 68. Naturally, as is described more fully hereinafter, the nature of the rate computer 56 and control circuit 64 are different in the present invention than in the aforementioned differential laser gyro. In the common (nondifferential) laser gyros known to the prior art, only a single polarization of waves is employed. That is, there is only one wave propagating in the clockwise direction and one wave propagating in the counterclockwise direction. Both waves have similar polarization (usually planar, but it may be circular or elliptical), and therefore need not employ the quarterwave plates 30, 46 nor the polarizers 34, 40, and in fact only employ a single channel of detection (such as 28, 38, 42 and 53). In such case, the output of the rate computer 56 is a measure of the angular rate of rotation of the apparatus plus (or minus) any bias which is introduced by the magnetic field of a bias device (such as the magnetic crystal 58). Such apparatus is known to utilize means (such as the piezoelectric transducer 68) for accurately controlling the center frequency of operation by controlling the length of the optical cavity.

The present invention, like the aforementioned differential laser gyro, utilizes, in a sense, two completely separate laser gyros operating in the same laser cavity. This is achieved by providing a polarization anisotropy, such as may be achieved by introducing birefringence into the optical cavity. In the present case (as in the aforementioned copending application) the birefringence may be provided by a quartz crystal having its optic axis parallel to the beam path. In this case, application of a magnetic field to the quartz crystal also provides a Faraday effect (magnetic bias). In such a case, the laser gyro is operated with circular or elliptical polarization (rather than plane polarization); however, by the simple expedient of positioning a pair of quarter-wave plates at either end of the magnetic crystal 58, orthogonally oriented with respect to each other, as is known in the art, the same apparatus (that shown in FIG. 1) can operate with plane polarization. In that event, the quarterwave plates 30, 46 become unnecessary since the laser radiation is plane polarized. A still further alternative is to employ an odd number of mirrors (such as three) and operate with linear polarization, the polarization anisotropy being caused by the different phase shift for reflections of the vertical and horizontal polarized waves. All of these possible modifications are well known in the art, and form no part of the present invention. It should merely be borne in mind that when the cavity is operated with plane polarization, magnetic bias can be effected only by converting the plane polarization to circular or elliptical polarization (within the bias element) by means of quarterwave plates at either end of the magnetic field.

Consider now the operation of the apparatus of FIG. 1 as diagrammatically illustrated in FIG. 2. Illustration $a$ of FIG. 2 shows the frequency of resonance of an isotropic laser cavity; this is, the frequency is illustrative of a single axial mode for which laser radiation is readily sustained in a cavity of a given length. The present invention (as is also true in the case of the aforementioned differential laser gyro) provides polarization anisotropy (the birefringence of the quartz crystal 58) so as to slow down frequencies of one circular polarization and speed up frequencies of the opposite circular polarization. Herein, it is assumed that the internal structure (i.e. the right-handedness or left-handedness) of the quartz crystal 58 is such that the frequency of the right circular polarized wave is lower than the isotropic cavity frequency and the frequency of the left circular polarized wave is higher than the isotropic cavity frequency. The frequency spread between the right and left waves may be on the order of $10^8$ Hz. In a cavity without any directional anisotropy, both the clockwise and the counterclockwise waves of each polarization would be at the same frequency, as shown in illustration $b$ of FIG. 2. Illustration $c$ of FIG. 2 shows the effect of a positive magnetic anisotropy, which introduces a positive bias. In this application, positive is taken to be indicative of the same effect on the frequency of a right circularly polarized wave as a positive or clockwise rotation of the device would provide. Thus, as is known with respect to laser gyros, since the wave travelling in the same direction as the rotation of the gyro achieves a lower frequency, the clockwise wave of the right circular polarization is lower in frequency than the counterclockwise wave. The frequency differential achieved is on the order of $10^5$ Hz, and represents a bias which is greater in magnitude than the largest angular rate which may be sensed; thus it is impossible for an angular rate opposite to the bias to force the two counter rotating waves to substantially the same frequency where frequency locking could occur. However, there is an opposite effect on the left circular polarized wave as shown in illustration $c$. Since the bias is created by the same magnetic field, but its effects are opposite for opposite polarizations, in the convention of the present application, the left circular polarized counterclockwise wave will have a lower frequency as a result of the magnetic bias than the left circular polarized clockwise wave.

Illustration $d$ of FIG. 2 shows the effect of positive rotation upon the frequencies of the four different waves in the cavity when the magnetic bias is positive. A positive rotation is taken in the convention of the present application to be clockwise, so that the clockwise waves are at lower frequencies than with no rotation. Similarly, the counterclockwise waves are at higher frequencies than they would be with no rotation. This is true for both the right and left circular polarized waves, since the effect of rotation upon frequency is independent of the polarization. This means that the right circular polarized waves are spread farther apart in frequency and the left circular polarized waves come close together in frequency, as shown in illustration $d$. The opposite effect occurs when there is a minus rotation as shown in illustration $e$. There the right circular polarized waves come closer together and the left circular polarized waves are spread farther apart as a result of the minus rotation.

Illustration $f$ of FIG. 2 shows the effect of an opposite bias which causes the right circularly polarized clockwise wave to be at a higher frequency than the right circular polarized counterclockwise wave, and contrastingly, causes the left circular polarized clockwise wave to be at a lower frequency than the left circular polarized counterclockwise wave. The effect of a positive rotation in this situation is shown in illustration $g$ wherein it is seen that the effect of negative bias and plus rotation is the same as the effect of positive bias and minus rotation: that is, the right circular polarized waves come closer together and the left circular polarized waves are spread farther apart.

FIG. 3 is another way of illustrating the relationship described with respect to illustration $b$ of FIG. 2. Therein, the isotropic cavity frequency is seen to be near to the frequency of maximum gain of the gain versus frequency characteristic of the laser gain medium. This results from the fact that one normally provides a cavity having a length which sustains oscillations at or near the frequency of maximum gain of the gain versus frequency characteristic of the laser gain medium. The operation of the aforementioned differential laser gyro, employing the same convention as utilized with respect to FIG. 2 hereinbefore, results in two different pairs of counter rotating waves, one which is left circular polarized at a frequency higher than the isotropic cavity frequency (in the convention of this application) and the other which is right circular polarized at a frequency lower than the isotropic cavity frequency, by an amount which is dependent upon the degree of polarization anisotropy provided within the cavity. On the scale shown in FIG. 3, it is impossible to show any bias effects since they are three orders of magnitude or more smaller than the frequency spread between the right and left waves. As alluded to briefly hereinbefore, one problem with the differential laser gyro has now been determined to be that the right and left waves are not operating near the center of the gain versus frequency characteristic as illustrated in FIG. 3. This results in the introduction of various errors, such as mode pulling and pushing (due in part to the fact that the clockwise and counterclockwise waves have different gain characteristics since they are disposed along a portion of the gain versus frequency characteristic which has a finite slope as a function of frequency).

One principle of the present invention is to sequentially switch the length of the cavity so as to cause laser oscillations to be sustained at the frequency of either the right or the left (but not both) polarized waves at any one time. Thus, at one time, the length of the optical cavity of FIG. 1 is decreased so as to increase the isotropic cavity frequency by an amount which is substantially half of the frequency differential between the right and left circular polarized waves as illustrated in FIG. 4. This puts the left circular polarized waves at such a high frequency (due to the polarization anisotropy provided by the birefringence of the quartz crystal 58) that it will not sustain oscillation. This places the right circular polarized waves very close to the frequency of maximum gain of the gain versus frequency characteristic. Then in a next increment of time, the length of the cavity is increased so as to cause the isotropic cavity frequency to be shifted below the frequency of maximum gain of the gain versus frequency profile by an amount which is roughly half of the frequency differential between the right and left circular polarized waves, as illustrated in FIG. 5. This causes the left circular polarized wave to sustain itself at a frequency which is close to the frequency of maximum gain of the gain versus frequency profile of the laser gain medium, and the right circular polarized wave to be so far down on the gain versus frequency profile as to not be sustained at all. Thus in each time increment (respectively corresponding to FIG. 4 and to FIG. 5) the laser oscillation is of an opposite polarization to that of the alternate time increment, but is sustained at the same frequency, near the maximum gain point of the gain versus frequency profile. This not only supplies maximum gain, but does so at a point where variations in frequency cause very little differential in gain, and where, therefore, the frequency difference between a clockwise and counterclockwise waves, which is caused by the directional anisotropy (bias) will have little adversely asymmetric effect on the different waves. This tends to greatly reduce the errors in a laser gyro employing two distinct lasers operating with opposite polarization in the same laser cavity, in accordance with the present invention.

The apparatus for controlling the laser gyro of FIG. 1 in accordance with the present invention, so as to provide sequentially switched operation of the invention, and differential operation as an adjunct thereto, if desired, is illustrated in FIGS. 6–8 and the timing thereof is shown in FIG. 9. Referring to FIG. 6, basic timing of the disclosed apparatus is under control of a half second squarewave oscillator 70, the output of which on a line 72 is shown in illustration $a$ of FIG. 9. This operates a monostable multivibrator 74 to generate a stop signal on a line 76 once every half of a second, as shown in illustration $d$ of FIG. 9. In addition, the half second squarewave signal on the line 72 is applied to a delay circuit 78 to provide a signal on a line 79 which is delayed somewhat (a millisecond or two is sufficient) from the signal on the line 72. This in turn drives a monostable multivibrator 80 so as to generate a read signal on a line 82 which is delayed somewhat from the stop signal on the line 76, and is shown in illustration (g) of FIG. 9. the signal on the line 79 in turn feeds a delay unit 84 so as to provide a signal on a line 86 which is delayed somewhat from the signal on the line 79 (again a millisecond is ample delay), which drives a flip flop 88 so as to provide alternate first and second period signals (1st, 2nd) on a pair of lines 90, 92, the timing of which is shown in illustrations $h$ and $n$ of FIG. 9. The signal on the line 86 is also applied to a third delay unit 94 which provides a signal on a line 95 delayed somewhat from the signal on the line 86 (a millisecond or two is ample). The signal on the line 95 drives a third monostable multivibrator 96 so as to provide a start signal on a line 97 which is delayed from the 1st and 2nd signals on the lines 90, 92, and which is shown in illustration $j$ of FIG. 9.

The 1st signal on the line 90 provides timing for right circular polarization (or, in another mode of operation described hereinafter, positive bias) and is applied through a switch 98$a$ and a line 100 to a switch 102 which provides at its output 104 a voltage that is equal to a voltage V2 provided to the switch 102 on a line 106, or is equal to a voltage V4 which is provided to the switch 102 on a line 108. The voltage V2 is chosen to be a voltage which will cause the piezoelectric crystal to decrease the length of the optical cavity, thereby causing an increase in the resonant isotropic frequency of the optical cavity, which in accordance with the convention described hereinbefore with respect to FIGS. 2 and 4, will support only right circular polarized oscillation due to the polarization anisotropy provided by the quartz crystal 58 (FIG. 1). On the other hand, the voltage V4 is chosen so as to substantially increase the length of the optical cavity thereby causing a resonant isotropic frequency thereof to be decreased so as to sustain only the left circular polarized radiation as described with respect to FIGS. 2 and 5 hereinbefore. Thus, when the switch 110$a$ is in the position shown in FIG. 6 indicating sequential operation, it provides a voltage on the line 66 which alternates between V2 and V4 in dependence upon the presence or absence of the signal on the line 90, which in turn is dependent upon the selected state of the flip flop 88. The signal on the line 66 is shown in illustration $b$ of FIG. 9. With the switch 110a changed to the position opposite to that shown in FIG. 6, the line 66 will have a voltage thereon (provided thereto by a line 112) equivalent to a voltage V3 which is midway between the voltages V2 and V4, and which causes the piezoelectric transducer 68 (FIG. 1) to adjust the length of the optical cavity so as to provide its isotropic resonant frequency at substantially the frequency of maximum gain of the gain versus frequency profile, thereby to support oscillation in a differential mode with both right and left circular polarized waves circulating therein, as is described hereinbefore with respect to FIG. 3.

The 1st signal on the line 90 is also applied to a flip flop 114 which changes state once for each appearance of the signal on the line 90 so as to provide alternative interval signals (X, Y) on a pair of lines 116, 118 which are at half the frequency of the alternating signals on the lines 90, 92. The X signal on the line 116 provides units of positive bias time and the Y signal on the line 118 provides units of negative bias time (or, in another operating mode described hereinafter, provide right and left polarization time increments). The X signal on the line 116 is applied through a switch 98$b$ and a line 119 to a switch 120 which is similar to the switch 102 and, when operated by the signal on the line 116 will provide a current from a source −I5 over a line 122 to a switch 110$b$ which provides that current to the line 60 for application to the coil of the magnetic crystal 58 (FIG. 1). On the other hand, in the absence of the signal on the line 116, the switch 120 will provide a current from a source +15 over a line 124 to the switch 110b so as to reverse the polarity of the current on the line 60 for application to the coil, thereby reversing the magnetic field in the magnetic crystal 58. This is shown in illustration c of FIG. 9. Reversing bias allows, according to a second principle of the invention, cancellation of certain errors caused by backscatter which are the same for opposite bias polarity, and thereby cancel through subtraction. When differential operation is desired, the switch 110b is transferred to the position opposite to that shown in FIG. 6 (simultaneously with the transfer of the switch 110a, which may be ganged therewith) so as to provide only the current +15 to the line 60 thereby maintaining a constant positive bias during differential operation. Of course, constant negative bias could be provided if desired, without altering the precepts of the present invention. A similar switch 110c connects a source of V1 volts on a line 125 to generate a sequental signal on a line 126 or a differential signal on a line 127, alternatively, depending on whether sequential or differential operation is selected.

Referring now to FIG. 7, the 1st frequency meter 52 and the 2nd frequency meter 53 are shown to include start and stop inputs which are respectively responsive to a start 1 signal on a line 130, a stop 1 signal on a line 132, a start 2 signal on a line 134, and a stop 2 signal on a line 136. The frequency meters 52, 53 may be of any widely available well known type, and as illustrated herein, are assumed to be the type which permanently register a digital output of the number of counts received at the respective input 140, 142 once the unit is stopped, and until the unit is again restarted, at which time it is automatically reset. This means that the frequency meters 52, 53 can also act as buffer registers of their own readings, which is taken advantage of in the illustrative embodiment of FIG. 7. The outputs of the frequency meters 52, 53 comprise a plurality of digital signals on a plurality of lines 54, 55 each of which is a digital representation of the count made by the frequency meter during the interval between starting and stopping in response to the related start and stop signals. These digital outputs are provided to a differencing circuit 144 which may simply comprise a well known binary adder arranged so that the input signals on the lines 55 are complemented so as to be subtracted from the input signals on the lines 54, and providing a complementary output on lines 146 and a carry on a line 148 if the result is negative (indicating that the value on the lines 55 is greater than the value on the lines 54).

Referring again to FIG. 2, illustration d shows that the right circular polarized wave has a greater frequency differential between its clockwise and counterclockwise waves than does the left circular polarized waves, when there is positive rotation with positive bias. Thus, subtraction of the count of pulses of the left circular polarized wave (on line 55) from the count of pulses of the right circular polarized wave (on line 54) will provide a positive output signal with no carry. On the other hand, illustration e shows that if minus bias is used, the situation is reversed and that a negative output will be provided when there is a negative rotation with positive bias, the negative output being manifested by a carry signal on the line 156. Thus when the bias is positive and there is a carry, the rotation rate being sensed is counterclockwise or negative. Similarly, illustration g of FIG. 2 shows that if the bias is negative and there is positive rotation, substracting the left circular polarized count from the right circular polarized count will get a negative result, thereby creating the carry signal on the line 148. The difference output of the differencing circuit 144 is applied in common to a gated register 150, a second differencing circuit 152, and a shifting input of a selectively-shifting gate 154. In subsequentially switched operation (of the type illustrated in FIG. 9) the right circular, positive bias laser radiation travels in both the clockwise and counterclockwise directons about the laser cavity 10 (FIG. 1) and the detector 36 supplies a frequency output to the frequency meter 52 which is equal to the difference in the frequency of the clockwise and counterclockwise waves. Since the frequency meter 52 is started just after the establishment of R+ operation (illustration b and c of FIG. 9) and is stopped just at the end of R+ operation (see also illustrations k and d of FIG. 9) the frequency meter 52 will have stored therein a digital count indicative of the angular rotation rate sensed by right circular polarized rediation in conjunction with positive bias. Immediately thereafter, the piezoelectric crystal is shifted so that left circular polarized radiation is sustained with positive bias and the frequency meter 53 is started so as to accumulate a count therein indicative of the rotation rate sensed by the left circular polarized rotation. During this time, since both inputs are applied to the differencing circuit 154, it suplies all sorts of erroneous output signals on its output lines 164, but these are not recognized by any other circuit, and therefore it is immaterial. However, once both frequency meters 52, 53 have a correct reading standing therein (at the end of positive bias operation as shown in illustrations b and c of FIG. 9) then the result on the signal lines 146 can be lodged in the register 150 by the appearance of a gate register signal on a line 156 which is generated by an AND circuit 158 in response to the read pulse on line 82 during the 2nd period of the X interval of sequential operation. Then right circular polarized operation with negative bias is commenced, the frequency meter 52 is started, and at the end of a half second period the 1st frequency meter 52 is stopped so as to register a digital value indicative of the rotation rate sensed with right circular polarization under negative bias. Then the piezoelectric transducer is again shifted and the 2nd frequency meter 53 is started, and allowed to run for a half a second, and then it is stopped so that it has a proper output. Now it can be seen that there is an angular rotation rate stored in the register 150 which was determined as the difference between the rate sensed with right circular polarization and the rate sensed with left circular polarization using positive bias, and the output of the differencing circuit 144 on signal lines 146 is a digital value indicative of the difference in angular rate sensed by right circular polarization and left circular polarization utilizing negative bias. The output of register 150 is constantly applied by lines 160 to the positive input of the differencing circuit 152, and the output of the differencing circuit 144 is constantly applied to the negative input thereof by lines 146. Therefore, the output of the differencing circuit 152 on signal lines 162 at this moment comprises the difference of the angular rates sensed with positive and negative bias utilizing both right and left circular polarization. This can be utilized as a result by providing a gate sequential signal on a line 164, which is generated by an AND circuit 166 in response to the read pulse on line 82 during each Y interval of sequential operation, and which gates the signals on the lines 162 through the selectively shifting gate 154 so as to provide these signals on output lines 168 without shifting (the purpose of the shifting is described hereinafter). This also passes a carry signal on a line 170 through to one of the signal lines 168, and may preferably comprise the high-order bit of the signal lines 168.

The signals on the lines 168, including the indication of sense or direction of angular rate from the line 170, provide a digital manifestation of the angular rate being sensed by the laser gyro, which is determined in one mode of sequential operation as the difference of the rate derived in a positive bias interval and the rate derived in a negative bias interval, each of which include a right and left circular polarized period. This signal may be utilized in any fashion desired, or may be passed through a scaling circuit 172 so as to scale it into a proper number value representing radians or degrees per unit of time, to provide the angular rate signals on the lines 57. Such a scaling circuit 172 may comprise a computer of some sort, or may simply comprise a look up system such as a read only memory which will automatically scale the numbers to those desired in any implementation of the present invention.

The gate register signal on the line 156 is generated by the AND circuit 158 during sequential operation due to the sequential signal on the line 126, in an interval of positive bias due to an X interval signal on the line 116, during left circular polarized operation due to the 2nd period signal on the line 92. The gate sequential signal on the line 164 is similarly generated by the AND circuit 166 in response to those read signals on line 82 which are generated during left circular polarization, but only in periods of negative bias due to the Y interval signal on the line 118. These two signals are shown respectively in illustrations h and i of FIG. 9. Thus it isn't until the presence of a read sequential signal that any information is derived. In the example of FIG. 9, this is a period of 2 seconds for each reading while in sequential operation. When in differential operation, both the 1st frequency meter and the 2nd frequency meter 52, 53 (FIG. 7) receive start and stop signals at the same times as is described with respect to FIG. 8 hereinafter, and in addition, every one of the read signals on the line 82 is passed by an AND circuit 176 so as to generate a read differential signal on a line 178. This is utilized in FIG. 7 to gate the result on the signal lines 146 through the selective shifting gate 154 with a shift of one binary bit to the left, so as to multiply the represented value by two. The reason for this is that since each of the four results reached in every 2 second period (FIG. 9) relates to a half second meter reading from both counters, in contrast with the single result for every 2 second period in sequential operation during which only a single counter operates, at any one time, the results will be one half as large as those derived during sequential operation. In order to provide for the same scaling circuit to scale either sequential or differential operation without any knowledge thereof, the sequential results are gated without shifting, whereas the differential results are multiplied by two by shifting one binary position to the left in the selective-shifting gates 154.

Thus, the apparatus described will operate in either the sequential mode or the differential mode, with simple transfer of the switch elements 110a–110c. The differential mode of operation may be used in order to establish proper operation of the apparatus from time to time, by establishing proper operation in the differential mode and switching to the sequential mode. This can be done by adjusting all the parameters (particularly the voltage V3, FIG. 6) until correct differential operation is observed with equal amplitude oppositely polarized waves, and providing correct voltages V2, V4 so that one is automatically assured of proper operation in the sequential mode, taking into account the volts/distance characteristic of the PZT 68. The determination of all the voltages herein is, of course, in accordance with well known teachings of laser gyros of the type known to the art. If desired, the differential mode of operation may also be utilized so as to provide outputs 4 times as rapidly as in the sequential mode during periods of high change in angular rotation rate, where accuracy is less important, and re-establishing operation in the sequential mode during periods of lower change in angular rotation rate, where greater accuracy is desired, and the less frequent outputs can be tolerated. To effect automatic change in mode of operation, there is illustrated at the bottom of FIG. 7 a rate detector circuit 180, the output of which can operate a coil 110d, which may be utilized to transfer all of the switching elements 110a –110 c automatically, in any case where the rate exceeds some predetermined given rate, which may simply be done by providing a compare circuit with one fixed digital input for comparison with the digital value on the lines 168. Naturally, when the compare circuit indicates that there is no longer a high rate, the coil 110d will become de-energized, allowing retransfer of the switches to the sequential position as shown in FIG. 6.

In the sequential mode of operation described thus far, which is now defined as the R/L mode, the bias is held constant for right circular polarization followed by left circular polarization, and then the bias is reversed for additional right and left circular polarizations. In this mode, the left circular polarization result is subtracted from that of the right circular polarization. However, it should be obvious by careful examination of FIG. 2 that the roles may be reversed in another mode of operation defined herein as the ± mode. That is, the right circular polarization can be maintained while the bias is reversed, and then the left circular polarization maintained for both polarities of bias, as seen in illustrations m and n of FIG. 9. In such a case, the roles of the flip flops 88, 114 (FIG. 6) in controlling the switches 102, 120 must be reversed so the 1st and 2nd period signals on the lines 90, 92 relate to plus and minus bias rather than right and left polarization, and the X and Y interval signals on the lines 116, 118 relate to right and left polarization rather than plus and minus bias, in order to give exactly the same result of the outputs. Similarly the roles of the flip flops in controlling the logic for generating the stop, start, read and gate signals are reversed, in an obvious fashion, as is illustrated in FIG. 9, and as described with respect to FIG. 8, herinafter.

The description thus far has been with respect to operation in the R/L mode in which the switches 98a and 98b of FIG. 6 are in the position shown therein. This causes the switch 102 to respond to the first period signal on the line 90 and the switch 120 to respond to the X interval signal on the line 116, thereby causing the operation of illustrations *b* and *c* (FIG. 9) which include a positive bias interval in which a right circular polarization period is followed by a left circular polarization period, and then a minus bias interval in which a right circular polarization period is followed by a left circular polarized period. However, by transferring the switches 98*a*, 98*b* to the position opposite to that shown in FIG. 7, operation may be achieved in the ±mode, as shown in illustrations *m* and *n* of FIG. 9. This provides an interval of right circular polarization in which a period of positive bias is followed by a period of negative bias, after which an interval of left circular polarization includes a period of positive bias followed by a period of minus bias. To identify the selected mode, a switch 98*c* applies voltage from the V1 source on line 125 to either one of two lines 190, 192.

In the description of FIG. 7 thus far, it has been assumed that right circular polarizaton signals on the line 50 are always applied to the input 140 of the 1st frequency meter 52, and the left circular polarization signals on the line 51 are always applied to the input 142 of the 2nd frequency meter 53. Also, the start and stop signals on lines 130, 132, 134 and 136 were assumed without describing their generation. However, when operating in the ±mode, the 1st frequency meter must receive right circular polarization during the first period of the X interval and the 2nd frequency meter must receive right circular polarization during the second period of the X interval, and the 1st frequency meter must receive left circular polarization during the first period of the Y interval and the 2nd frequency meter must receive left circular polarization during the second period of the Y interval, as is shown in illustrations *m* and *n* of FIG. 9. This is achieved in FIG. 7 by an OR circuit 182 which passes right circular polarization on the line 50 to the input 140 in response to an AND circuit 183, and which passes left circular polarization from the line 51 through to the input 140 in response to operation of an AND circuit 184. The AND circuit 183 operates in response to a R/1 signal on a line 185, and the AND circuit 184 operates in response to a L/1 signal on a line 186. Similarly, right circular polarization on the line 50 is passed by an AND circuit 188 through an OR circuit 190 when there is a R/2 signal on a line 192, and left circular polarized signals on the line 51 are passed to the input 142 by an AND circuit 194 in response to the presence of a L/2 signal on a line 196.

All of the frequency meter control signals used in FIG. 7 are generated in FIG. 8. Therein, the start and stop signals are generated by a plurality of OR circuits 200–203 in response to respective AND circuits 204–211. The start signal on the line 100 is applied to the AND circuits 204–207 and the stop signal on the line 76 is applied to the AND circuits 108–211. Since the 1st frequency meter 52 always reads during the 1st period of both the X and Y intervals during sequential operation, the AND circuit 204 operates in response to the sequential signal and the 1st signal. Similarly, the AND circuit 208 operates in response to the sequential signal and the 1st signal. Because the 2nd frequency meter 53 is always utilized during the 2nd period in either one of the sequential modes of operation, the AND circuit 206 operates in response to the sequential signal and the second signal, and the AND circuit 210 operates in response to the sequential signal and the 2nd signal. During differential operation, which as defined herein utiilzes constant positive bias and has both right and left utilizes polarization circulating in the optical cavity 10 (FIG. 1) at all times, each of the frequency meters can be read in each of the periods of both of the intervals. That is, both the first and second frequency meters operate in all four periods of a cycle. Therefore, the AND circuits 205, 207, 209 and 211 respond to respective stop and start signals whenever they appear in the differential mode since each will have present at the input thereto the differential signal on the line 127.

In order to control application of the detector outputs to the frequency meters, the steering signals (R/1, R/2, L/1, L/2) on the lines 185, 192, 186 and 196, respectively, are generated in the same fashion for the differential and R/L modes, but are mixed up in the ±mode. Specifically an OR circuit 220 can generate the R/1 signal on the line 185 in response to either the differential signal on the line 127 or the R/L signal on the line 190; it also generates the R/1 signal in response to an AND circuit 222 which operates during the 1st period of an X interval while in the ±mode (see illustration *n* of FIG. 9). Similarly, the L/2 signal on the line 196 is generated by an OR circuit 224 during differential or R/L modes, or in response to an AND circuit 226 in the 2nd period of a Y interval when in the ±mode (see illustration *n* of FIG. 9). On the other hand, there is only one instance when right circular polarization is to be applied to the second frequency meter, so that an AND circuit 228 generates the R/2 signal on the line 192 only during the 2nd period of an X interval when in the ±mode. Similarly, an AND circuit 230 generates the L/1 signal on the line 186 only during the 1st period of the Y interval when in the ±mode (see illustration *n* of FIG. 9).

Thus, in sequential operation, a cycle consists of the two different X and Y intervals, each subdivided into 1st and 2nd periods, thereby providing four distinct subcycles, each having the same duration as one of the periods. When in the R/L mode of operation, the increments of time relating to one polarization or the other are coextensive with the 1st and 2nd periods, and the units of time relating to one bias or the other are coextensive with the X and Y intervals. On the other hand, when operating in the ±mode, the increments of time relating to one or the other of the polarizations are coextensive with the X and Y intervals, and the units of time relating to the different biases are coextensive with the 1st and 2nd periods.

The choice of which mode (R/L, ±) is chosen during sequential operation is dependent only upon results which are achieved. Because of the many complexities of a laser gyro, the types of errors which may be generated therein cannot always be anticipated. However, since backscattering introduces an error which is the same in positive and negative bias states, if backscatter error were significant and changing rapidly, the ±mode may be preferred so as to do a better job of cancelling the error by subtraction. On the other hand, a lack of symmetry in magnetic bias may cancel more completely if the R/L mode is utilized. In any event, either mode could be utilized alone (thereby eliminating the need for the switch 98*a*); and by proper allocation of the frequency meters (in the manner described for the R/L mode hereinbefore) the apparatus of FIG. 8 would not be necessary to accommodate a single sequential mode.

Referring again to FIG. 7, as described hereinbefore, both of the differencing circuits 144, 152 can provide either positive or negative outputs. When the outputs are negative, it is because the assumed positive input is in fact smaller in value than the assumed negative input, and this results in a negative number at the output together with a carry signal. By taking the examples of FIG. 2 and considering the effect of positive and negative numbers, however, it is seen that in any case where a true angular rate is being read by any of the modes herein, the output of the shifter 154 will be a positive number without any carry signal when the angular rate being sensed is a positive or clockwise rate, and the output of the selective-shifting gate 154 will be a negative (or complementary) number with a carry attached thereto whenever the rate is negative or counterclockwise. The utilization of numbers in positive and negative format is well known, and may be accommodated in the scaling circuit 172, if desired, so as to supply an absolute magnitude with a sign indication of the direction of rotation. Similarly, altering the positive and negative sense of the differencing circuits 144, 152, in various ways, and perhaps adding recomplemented signals instead of subtracting complementary signals, and the like, may be achieved if desired. However, the net effect has to be a series of subtractions if the errors which sequential operation are desired to eliminate are in fact to be cancelled from the output. Obviously, if a result obtained with positive bias were added to a result obtained with negative bias, the total output value would be equal to twice the bias, with angular rate cancelled out, rather than twice the angular rate with the bias cancelled therefrom. It is in this sense that the terms difference and subtraction are used herein: that is, referring to combinations which inherently cause cancellation of nonrate information and errors.

The necessity for differencing, as described hereinbefore, is based on the fact that the R+ and L− waves are similar, and the R− and L+ waves are similar. Thus, subtracting L− from L+ gives a result which is opposite from the result achieved when subtracting R− from R+; similarly, subtracting L+ from R+ gives a result which is opposite to the result achieved when subtracting L− from R−. However, if, instead, L− is subtracted from L− or R− is subtracted from L−, while R− is subtracted from R+ or L+ is subtracted from R+, the results are of the same sense, and can be added so as to provide an output indicative of twice the angular rate, with magnetic bias cancelled, and, dependent in part upon choice of the R/L or ± modes, with substantial cancellation of bias asymmetries and backscatter errors.

In addition, it is possible and may, under certain conditions, be desirable to utilize, by means of circuit modifications illustrated in a second, preferred embodiment of the invention described with respect to FIGS. 10–12 hereinafter, other sequences of the four basic operating states: R+, R−, L−, L+. This particular sequence, for example, has the property that bias and polarization are never switched simultaneously, thus minimizing switching transients in the laser.

Figure 11:
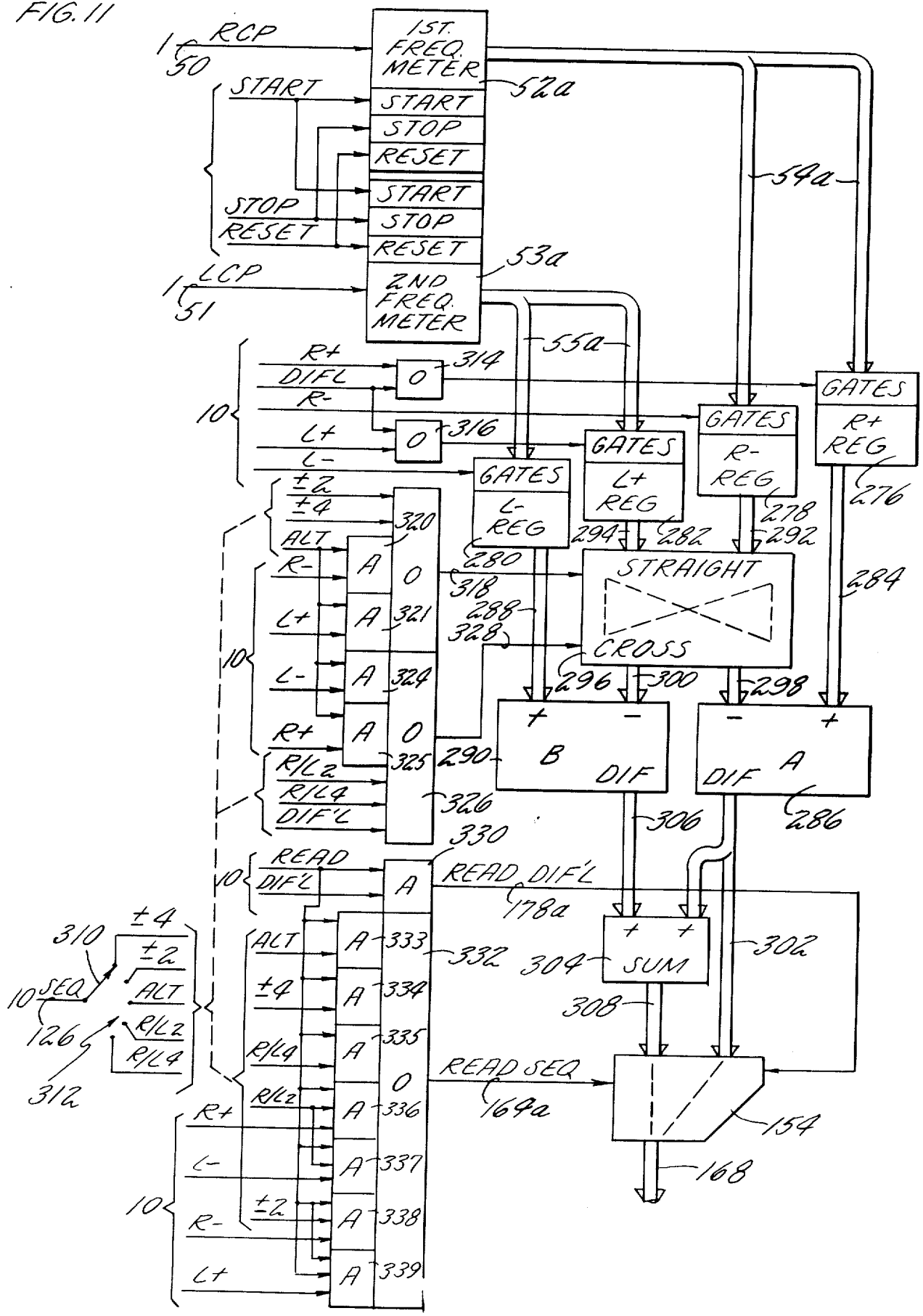
FIG. 11 is a simplified schematic block diagram of preferred rate computer circuitry for use in the gyro of FIG. 1.

The second illustrative embodiment of the invention, which for many purposes is preferred over the embodiment of FIGS. 6–9, is illustrated in FIGS. 10–12.

In FIG. 10, the basic timing is under control of the square wave oscillator 70 and the three delay circuits 78, 84, 94, as in the prior embodiment, and the stop signal on the line 76 and start signal on the line 100 are generated in the same fashion. However, as is shown in illustration $a$ of FIG. 12, the present embodiment contemplates a gate signal and a read out and reset signal interspersed between the stop signal and the start signal. The gate signal is generated on a line 240 by a monostable 242 in response to the output of the delay unit 78, and the read out and reset signal is generated on a line 244 by a monostable 246 in response to the output of the delay circuit 84. Thus, the read out and reset signal on the line 244 corresponds in time with the signal on the line 86, which is utilized in the prior embodiment to cause switching between the X and Y intervals and/or the 1st and 2nd periods. For simplicity, the read out and reset signal on the line 244 is shown separately as a read signal on a line 248 and a reset signal on a line 250.

The output of the delay unit 84 on the line 86 is also used to switch a flip flop 252, in the same fashion as the flip flop 88 is switched in FIG. 6. However, the output of the flip flop 252 is not used directly for control signals; rather the set side of the flip flop 252 operates a flip flop 254 and the reset side of the flip flop 252 operates a flip flop 256 which in turn generate signals defining alternate right circular polarization and left circular polarization time increments (referred to as R and L) and alternate units of plus and minus bias time (referred to hereinafter as + and −), as shown in illustrations $b$ and $(c)$ of FIG. 12. These are of equal length, but staggered with respect to each other, thereby to provide four subcycles of R+, R−, L−, and L+ operation in a cycle, while changing only bias or only polarization at any one given time. It should be noted that the embodiment of FIGS. 6–9 could equally well be operated with this staggered timing arrangement, without altering any of the data flow or control of FIGS. 7 and 8. The R output of the flip flop 254 on a line 258 always controls the switch 102 so as to alternate the voltage on the line 66 which controls the length of the optical cavity (FIG. 1). Similarly, the + output of the flip flop 256 on the line 260 always controls the switch 120 so as to alternate the polarity of the bias current on the lines 60, 62. The flip flop 254 alternately provides an increment of left circular polarization time by means of an L signal on a line 262, and the flip flop 256 alternately provides a unit of minus bias time by means of a − signal on a line 264. These signals are combined in a plurality of AND circuits 266 in an obvious fashion so as to provide an R+ signal on a line 268, an R− signal on a line 270, an L+ signal on a line 272, and an L− signal on a line 274. It is these signals that define the four subcycles of a cycle as shown in illustration $d$ of FIG. 12. The prior embodiment utilizes the frequency meters as storage devices, and in the ± mode requires switching of the R− signals to the second frequency meter and switching of the L− signals to the first frequency meter. The present embodiment, as seen in FIG. 11, does not utilize the frequency meters for storage, and does not require switching of the right and left circular polarization between the meters. This may result in less perturbation of the frequency meters which may occur as the result of cumulative noise provided by the input switching logic of FIG. 7. In the embodiment of FIG. 11, the frequency meters 52a, 53a are assumed to be similar to the frequency meters 52, 53 shown in FIG. 7, but are of the type which include a reset input, which are common in the industry. Thus, the meters 52a, 53a can be restarted after being stopped, and the count after restarting will be cumulatively added to the count acquired prior to stopping. However, as used herein, the meters are always reset, so it is immaterial in either embodiment as to whether or not the frequency meters utilized include separate reset inputs. The output of the frequency meter 52a is applied over lines 54a to a gated R+ register 276 and to a gated R− register 278. The output of the frequency meter 53a is passed over a plurality of lines 55a to a gated L− register 280 and to a gated L+ register 282. The R+ register 276 is always connected by lines 284 to the positive input of a differencing circuit 286, and the L− register 280 is always connected by lines 288 to the positive input of a differencing circuit 290. On the other hand, the R− register 278 and L+ register 282 are connected by corresponding lines 292, 294 to a straightcross circuit 296, the respective outputs of which on lines 298, 300 are respectively connected to minus inputs of the differencing circuits 286, 290. Thus, in a ± mode of operation, the straight cross circuit 296 is maintained in a straight mode, so that the R− register content is subtracted from the R+ register content in the differencing circuit 286, and the L+ register content is subtracted from the L− register content in the differencing circuit 290. However, in the R/L mode of operation, the straight-cross circut 296 is caused to operate in a cross mode so that the content of the R− register is subtracted form the content of the L− register in the differencing circuit 290, and the content of the L+ register is subtracted from the content of the R+ register in the differencing circuit 286. Similarly, when operating in the differential mode, in which both right and left circular polarizations are maintained at all times, and the bias is not reversed, the straight-cross circuit 296 is caused to operate in the cross mode thereby permitting subtraction of the content of the L+ register from the content of the R+ register in the differencing circuit 286. For operation in the differential mode, the output of the differencing circuit 286 is applied over a plurality of lines 302 to the shifting input of the selectively-shifting gates 154 so as to be multiplied by two as it is passed through the gates 154, thereby to have a scale factor which is equivalent to that achieved in the sequential mode, as described hereinbefore. The signal lines 302 are also applied to a summing circuit 304, as are a plurality of lines 306 carrying the output of the differencing circuit 290. Thus, in sequential operation, the sum circuit 304 provides, on a plurality of lines 308, signals relating to the sum of the outputs of the differencing circuits 286, 290.

The embodiment of FIGS. 10–12 encompasses several modes of operation. As described hereinbefore, ± modes of operation occur when the bias is switched while the polarization is maintained the same, and R/L modes occur while the polarization is switched during a period of the same bias. Because of the provision of the registers 276–280, it is possible during each quarter cycle to obtain an output from the device, utilizing one element of current information, such as $(L+)_2$ along with three prior units of information, such as $(L-)_2$, $(R-)_1$, and $(R+)_1$, as shown in illustration d of FIG. 12. In that example, both L+ and L− are derived during the same polarization time increment, and R+ and R− are derived during the same polarization time increment. However, in the next time period, the most recently derived information is $(R+)_3$, which is in a different increment of polarization time from $(R-)_1$ with which it must be combined. Similarly, two quarter cycles later, the most recent information is $(L-)_4$ which is derived in a different polarization time increment from $(L+)_2$, three quarter-cycles earlier. Similarly, as is shown in illustration (i) of FIG. 12, the fifth quarter cycle allows combining $(R+)_3$ with $(L+)_3$ in an R/L mode, as well as combining $(L-)_2$ with $(R-)_2$. However, the very next quarter cycle shows that the latest information derived is $(R-)_4$, which must be combined with $(L-)_2$ that is derived in different units of bias time, and if there is a rapidly changing bias inequality, the bias effects will not be cancelled perfectly. Thus, there are circumstances in which it may be more desirable to take an output every other quarter cycle, wherein each output causes the particular effect to be cancelled (by means of the sequential operation of the present invention) in as close a time period as is possible. Therefore, there are five different sequential modes of operation provided (bottom of FIG. 11) by a switch 310 which responds to the sequential signal on the line 126 to generate signals representative of ± 4, ± 2, alternate, R/L 2, and R/L 4 mode signals on a plurality of correspondingly marked lines 312.

Consider first the ± modes. Illustration d of FIG. 12 shows the successive right and left polarizations with plus and minus bias enumerated so that quarter cycles formed with the same polarization bear the same numerals, and quarter cycles with successive polarizations bear successively higher numerals. In all ± modes, R− is subtracted from R+, and L+ is subtracted from L−. Illustration e shows the output of the differencing circuit A 286; illustration f shows the output of differencing circuit B 290; and illustration g shows the output of the summing circuit 304. It can be seen that during each R+ period, the current R+ value is being compared with a prior R− value, and cancellation of backscatter errors may not be complete since these errors have had significant time to change. Similarly, during each L− period, the current value of L−has subtracted therefrom a value of L+ which is derived three periods earlier, so that complete cancellation of backscatter errors is less likely. However during the R− periods, both the R values are from the same polarization time increment, and both of the L values are from the same polarization time increment, even though these are derived in two different polarization time increments for R and L. The same is true during each L+ period. Thus the ± 4 mode of operation permits getting an output during each period, but will tend to cancel backscatter errors completely (along with certain other errors) only in every other cycle, whereby certain of these errors will simply be averaged. On the other hand, the ± 2 mode shown in illustration h of FIG. 12 provides an output only in every other period, but each output relates to an immediately adjacent corresponding period insofar as subtractions are concerned. In the ± modes, the desire is to cancel errors which are for waves of a given polarization, essentially independent of the bias polarity, and are therefore cancelled by differencing. Since the output of the frequency meters 52a, 53a are lodged in the registers 276–282, it is immaterial that the R values are derived two periods distant from the time of deriving the L values. The significant thing is that each R value is derived in a period adjacent to the other R value, and each L value is derived in the period adjacent to the other L value.

Consider now the R/L modes of operation, in illustration *i* of FIG. 12. Various values of R and L are enumerated differently than in illustration *d* so as to reflect adjacent periods of the same bias. Illustration *j* shows the output of the differencing circuit A 286, illustration *k* shows the output of the differencing circuit B 290, and illustration *l* shows the output of the summing circuit 304. In a manner which is similar to that described hereinbefore with respect to the ± modes, it can be seen that the output which is derived on an every period basis, as shown in illustration *i* includes periods R− and L+ in which both positive signals are not from the same bias time unit, or both negative signals are not from the same bias time unit; similarly, the periods R+ and L− provide outputs in which both positive signals are from the same bias time unit and both negative signals are from the same bias time unit. Thus, as shown in illustration *m* of FIG. 12, the R/L 2 mode selects outputs of every other period, in which the inputs to each differencing circuit are taken from the same bias time unit, thereby to ensure substantial cancellatin or any difference between the positive and negative bias (including external effects such as the earth's magnetic field), since whatever bias is in the optical cavity is completely subtracted from waves of opposite polarization in each output.

The fifth sequential mode is the alternative mode, in which the output of the ± 2 mode is interleaved with the output of the R/L 2 mode so that every other output has maximum backscatter cancellation and the alternate outputs have maximum cancellation of bias reversal errors. It can be assumed that the utilization device will tend to integrate these over a period of time, whereby the overall best result may possibly be achieved in some cases. On the other hand, in cases where the backscatter error is considerable and rapidly changing, the ± 2 mode may be preferable; in cases where rapidly changing magnetic effects are causing a dominant error, the R/L 2 mode may be preferred. The ± 4 mode and the R/L 4 mode are each alternatives to differential operation in periods when rapid changes in angular rate require an output during each period, but either backscatter or magnetic effects seem to be dominant error sources at the present time. In any event, the embodiment of FIGS. 10–12 provide a wide choice of sequential modes, along with the differential mode.

The logic for controlling the data flow apparatus of FIG. 11 described hereinbefore is all very simple in nature. The R+ register 276 is caused to be gated to receive a new frequency meter output during each R+ period, and during the other three periods as well in the differential mode of operation, by a gate signal provided by an OR circuit 314. Similarly an OR circuit 316 causes the L+register 282 to be gated during each L+ period in sequential operation, and all four periods during differential operation. The R− register 278 is gated by the R− signal, and the L− register 280 is gated by the L− signal.

The straight cross circuit 296 is caused to pass signals straight through (without crossover) so that the R−register is applied to the differencing circuit 286 and the L+ register is applied to the differencing circuit 290, in response to a signal on a line 318 generated by an OR circuit 319 in response to either one of two AND circuits 320, 321, or in response to the ± 2 mode signal or the ± 4 mode signal. Thus, in the ± mode, R− is subtracted from R+, and L+ is subtracted from L−. During the alternate mode of operation, the AND circuits 320 and 321 cause straight operation during R− periods and during L+ periods, so as to cause the ± 2 mode output shown in illustration *h* of FIG. 12, to be achieved as outputs. On the other hand, during the alternate mode of operation, a pair of AND circuits 324, 325 are caused to be respectively operated by L− and R+ signals so as to acquire the R/L 2 mode outputs, as shown in illustration *m* of FIG. 12, for combination with those of the ± 2 mode of illustration *h*. The AND circuits 324, 325 operate on OR circuit 326 which provides a cross input on a line 328 to the straight cross circuit 296. The OR circuit 326 also operates during either of the R/L modes, or during differential operation so as to provide subtraction of the L+ register from the R+ register.

Readout is controlled in response to a read differential signal on a line 178a or in response to a read signal on a line 164a in a manner which is similar to that described with respect to the embodiment of FIGS. 6–9 hereinbefore. During differential operation, an AND circuit 330 responds to each of the read signals so as to cause a shifted output of the differencing circuit 286, as described with respect to the prior embodiment. During sequential operation, the read signal on the line 164a is generated by an OR circuit 332 in response to any one of a plurality of AND circuits 333–339. The AND circuit 333 operates similarly to the AND circuit 330, and causes an output to be gated during each period of alternate mode operation. Similarly, the ± 4 and R/L 4 modes cause the AND circuits 334, 335 to provide a read signal during each period. On the other hand, during the R/L 2 mode of operation, the AND circuits 336 and 337 are operated only during R+ and L−periods (see illustration *m* of FIG. 12). Similarly, during the ± 2 mode of operation, the AND circuits 338, 339 provide read sequential signals only during the R− and L+ periods (see illustration *h* of FIG. 12).

In FIG. 12, the output results are shown spanning the entire period, for each of the R+,R−, L− and L+periods. However, it should be understood that the result is available only after the registers have been gated (see illustration *a* FIG. 12), near the end of the period, and the results are actually sensed only at the change from one period to another as called for by the read out and reset signal (illustration *a* of FIG. 12). The bulk of each period finds one frequency meter counting, and at the end of that period that count is transferred to a related register; during the same period of time, the other frequency meter is also counting, but its output is not gated at the end of the period, except in differential operation, and is therefore immaterial. In fact, a single meter could provide inputs to all four registers during sequential operation, if input switching of the type illustrated in FIG. 7 were provided to the apparatus of FIG. 11. However, in such event, it would be impossible to operate in the differential mode wherein both right and left circular polarizations are monitored during each period.

In the embodiment of FIGS. 10–12, the two differencing circuits feed a sum circuit simply because their outputs are of the same sense with respect to angular rotations, and of an opposite sense with respect to errors which it is desired to cancel. This is in contrast with the total differencing which was described hereinbefore as being necessary with respect to the embodiment of FIGS. 6–9. However, it can be noted by comparing the two embodiments that the net effect is substantially the same, as illustrated more fully in the following table of relationships:

TABLE OF RELATIONSHIPS

| | | |
|---|---|---|
| (1) and | [(R+)−(R−)]−[(L+)−(L−)] | = (R+)−(R−)−(L+)+(L−) |
| (2) | [(R+)−(R−)]+[(L−)−(L+)] | = (R+)−(R−)+(L−)−(L+) |
| (3) | | = (R+)−(R−)−(L+)+(L−) |
| (4) | [(R+)−(L+)]−[(R−)−(L−)] | = (R+)−(L+)−(R−)+(L−) |
| (5) | | = (R+)−(R−)−(L+)+(L−) |
| (6) | [(R+)−(L+)]+[(L−)−(R−)] | = (R+)−(L+)+(L−)−(R−) |
| (7) | | = (R+)−(R−)−(L+)+(L−) |
| (8) | [(R−)−(R+)]−[(L−)−(L+)] | = (R−)−(R+)−(L−)+(L+) |
| (9) and | | = −[(R+)−(R−)−(L+)+(L−)] |
| (10) | [(R−)−(R+)]+[(L+)−(L−)] | = (R−)−(R+)+(L+)−(L−) |
| (11) | | = (R−)−(R+)−(L−)+(L+) |
| (12) | | = −[(R+)−(R−)−(L+)+(L−)] |
| (13) | [(L+)−(L−)]−[(R+)−(R−)] | = (L+)−(L−)−(R+)+(R−) |
| (14) | | = −[(R+)−(R−)−(L+)+(L−)] |
| (15) | [(L+)−(L−)]+[(R−)−(R+)] | = (L+)−(L−)+(R−)−(R+) |
| (16) | | = (L+)−(L−)−(R+)+(R−) |
| (17) | | = −[(R+)−(R−)−(L+)+(L−)] |

Since relationships (1), FIGS. 6–9, ± mode; (3), FIGS. 10–12, ± mode; (5), FIGS. 6–9, R/L mode; and (7), FIGS. 10–12, R/L mode are all the same, it is seen that the output from either embodiment, in either an R/L or a ± mode, is the same, and only the effects on errors vary between the embodiments and the modes. In fact the effect on errors is the same in the embodiments of FIGS. 6–9 as it is in the embodiment of FIGS. 10–11 on a mode for mode basis. However, treating L− as equivalent to R+ and using the summing circuit 304 instead of a combining differencing circuit (such as the differencing circuit 152 of FIG. 7) permits additional flexibility in the choice of operating modes, as described hereinbefore.

As shown in illustrations d and g of FIG. 2, R+ operation provides the same response to rotation as L−, and R− provides the same response to rotation as L+; it should be understood, therefore, that R+ cannot be differenced with L−, and R− cannot be differenced with L+ without cancelling the angular rotation effect; in all cases, R+ and L− must eventually have a similar role and L+ and R− must have a similar rule. Thus it is that a signal having first polarization and first bias is similar to and must be summed with a signal having second polarization and second bias, and a signal with first polarization and second bias, is similar to and must be summed with a signal of second polarization and first bias, and differencing is between like polarizations and opposite bias, or like bias and opposite polarizations. As relationships (1) and (5) show, this is in fact what occurs in the embodiment of FIGS. 6–9, as well as in that of FIGS. 10–12. Relationships (8)–(17) show that many other sum and differencing combinations may be made, with only a sense reversal which can easily be accommodated.

It should be apparent that in the embodiment of FIG. 11, instead of a straight cross circuit 296, switching of the outputs of the frequency meters 52a, 53a between the R− and L+ registers so as to alternatively reverse their roles may be achieved if desired, without altering the operation of the device in any fashion. However, such a modification, unless the straight cross circuit 296 were also included, would eliminate the possibility of the alternate mode, since stored signals have to be switched between the differencing circuits.

In any of the embodiments, if desired, fast coarse outputs may be derived by utilization of a digital to analog converter at the output of one of the differencing circuits, so as to provide an output having the bias cancelled, but perhaps not having all of the errors cancelled. An even faster, continuous output may be derived by having a clock running at a rate corresponding to the effect which bias has on the magnitude of the count at any given moment, the count of the auxiliary clock being subtracted on an instant by instant basis from the count being accumulated in a frequency meter, thereby to give a coarse output, full of errors, but with bias roughly cancelled therefrom.

Although adjusting the position of the single mirror is shown as a means for altering the isotropic cavity resonance frequency of the laser gyro in accordance with the present ivention, thereby to switch between different polarizations, but causing the polarizations each to operate, alternatively, at substantially the maximum gain point of the frequency versus gain characteristic, it would be possible to adjust the position of all mirrors, thereby to maintain symmetry; it would also be possible to provide other effective optical path length adjustment means instead of positioning means. For instance, variable pressure gas cells disposed in the optical path may be employed to operate under electronic control to adjust the optical length of the cavity.

Another modification that may be made is to alter the clock rate of the device; this may be done by multiples of two, with suitable adjustment in the scale factor, if desired. This would permit very long accurate counts in slow periods of change (as might obtain during a stellar flight), or alternatively operating at a much higher rate where accuracy is less important, but rapid updating of the information is desired.

If desired, it is also possible to provide additional switching elements so as to permit operation in the conventional fashion (that is, with only a single polarization in the cavity, though perhaps with bias switching).

Similarly, the invention may be practiced in a mode which provides bias switching in alternate periods, while operating in a differential mode, thereby to reduce backscatter errors. However, such modes add little value in contrast with the three modes provided herein, and exhibits rather large errors in contrast with the sequential modes of the present invention.

Although the invention has been shown and described with respect to an illustrative embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent is:

1. A sequentially switched laser gyro comprising:
a closed loop optical cavity including a plurality of mirrors defining an optical path, and including selectively operable means for adjusting the length of said optical path and the commensurate isotropic cavity resonance frequency of said optical cavity and having a laser gain medium disposed in said optical path;

a polarization anisotropy disposed in said optical path, wherein said optical cavity sustains laser oscillations in two different substantially mutually opposite polarizations at different frequencies;

means for extracting counterclockwise waves from said cavity;

means for extracting clockwise waves from said cavity;

means for mixing the clockwise and counterclockwise waves extracted from said cavity and for separating said waves into waves of a first one of said polarizations and waves of a second one of said polarizations;

means responsive to said first polarization waves for providing first signals at a frequency proportional to the difference in frequency of the clockwise and counterclockwise waves of said first polarization;

means responsive to said second polarization waves for providing second signals at a frequency proportional to the difference in frequency of the clockwise and counterclockwise waves of said second polarization;

frequency control means including cyclically operable means for selectively operating said optical path length adjusting means thereby to adjust the length of said optical path to support waves of said first polarization during first increments of time interspersed with second increments of time, said increments of time being of equal duration, and for selectively operating said optical path length adjusting means to adjust the length of said optical path to support waves of said second polarization during said second increments of time; and output means providing an output manifestation of angular rate of said sequentially switched laser gyro as a function of a combination of said first signals provided in response to waves of said first polarization during said first increments of time and said second signals provided in response to waves of said second polarization during said second increments of time.

2. A sequentially switched laser gyro according to claim 1 wherein said output means comprises means providing said output manifestation as the difference between said first and second signals.

3. A sequentially switched laser gyro according to claim 1 wherein said frequency control means further comprises means for selectively operating said optical path length adjusting means to adjust the length of said optical path to support waves of both polarizations simultaneously in all of said increments of time and wherein said output means comprises means for providing said output manifestation as a function of the difference between said first signals and said second signals provided during each of said increments of time.

4. A sequentially switched laser gyro according to claim 1, further comprising:

a directional anisotropy disposed in the optical path of said optical cavity, thereby to provide, for waves of a given polarization, a difference frequency bias between waves circulating in one direction and waves circulating in the other direction, said bias being equivalent to at least the largest angular rate to be sensed by said sequentially switched laser gyro, the polarity of said directional anisotropy being a function of the polarity of control signals applied thereto and of the polarization of the circulating waves; and cyclically operable means for providing control signals to said directional anisotropy, said means providing said control signals in opposite polarity in alternate units of time, said alternate units of time being equal to each other and related to said first and second increments of time in a manner to provide contiguous cycles made up of four subcycles representing the four possible different combinations of said first and second increments of said alternate units of time, and wherein said output means provides said output manifestation as a function of angular rate indicated by said first and second signals generated during four contiguous subcycles.

5. A sequentially switched laser gyro according to claim 4 wherein said increments of time are one half the duration of said units of time and said output means comprises means providing said output manifestation as the combination of (1) the difference between said first and second signals taken in a first unit of time and (2) the difference between said first and second signals taken in a unit of time contiguous with said first unit of time.

6. A sequentially switched laser gyro according to claim 4 wherein said units of time are one half the duration of said increments of time and said output means comprises means providing said output manifestation as the combination of (1) the difference between said first signals in a first unit of time and said first signals in a second unit of time and (2) the difference between said second signals in a third unit of time and said second signals in a fourth unit of time, said first and second units of time being in a first increment of time and said third and fourth units of time being in an increment of time contiguous with said first increment of time.

7. A sequentially switched laser gyro according to claim 4 wherein said frequency control means further comprises means for selectively operating said optical path length adjusting means to adjust the length of said optical path to support waves of both polarizations simultaneously in all of said subcycles of time and said cyclically operable means further comprises means for selectively controlling signals of the same polarity in all of said units of time, and wherein said output means comprises means for providing said output manifestation as a function of the difference between said first signals and said second signals provided during each of said subcycles.

8. A sequentially switched laser gyro according to claim 4 wherein said units of time are equal in duration to said increments of time and timed to commence at the middle of said increments of time.

9. A sequentially switched laser gyro according to claim 8 wherein said output means comprises means providing said output signal as the sum of (1) the difference between said first signals in a first subcycle and said first signals in a second subcycle contiguous with said first subcycle, and (2) the difference between said second signals in a third subcycle and said second signals in a fourth subcycle contiguous with said third subcycle and in a contiguous, four subcycle group with said first and second subcycles.

10. A sequentially switched laser gyro according to claim 8 wherein said output means comprises means providing said output signal as the sum of (1) the difference between said first and second signals in mutually contiguous first and second ones of said subcycles, and (2) the difference between said first and second signals in mutually contiguous third and fourth ones of said subcycles in a contiguous, four subcycle group with said first and second subcycles.

11. A sequentially switched laser gyro according to claim 4 wherein said output means comprises means for providing said output manifestation as the difference between (1) the sum of said first and second signals provided in response to waves of said first polarization and first bias and of said second polarization and second bias and (2) the sum of said first and second signals provided in response to waves of said first polarization and second bias and said second polarization and first bias.

12. A sequentially switched laser gyro according to claim 11 wherein said units of time are equal in duration to said increments of time and timed to commence at the middle of said increments of time.

* * * * *